(12) United States Patent
Kim et al.

(10) Patent No.: US 10,118,144 B2
(45) Date of Patent: Nov. 6, 2018

(54) VESSEL FOR REMOVING HYDROCARBONS ON CATALYST

(71) Applicant: UOP LLC, Des Plaines, IL (US)

(72) Inventors: Minwoo Kim, Wood Dale, IL (US); Michael S. Sandacz, Glen Ellyn, IL (US); Kyle L. Kron, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/476,444

(22) Filed: Mar. 31, 2017

(65) Prior Publication Data

US 2018/0280908 A1   Oct. 4, 2018

(51) Int. Cl.
| | | |
|---|---|---|
| *B01J 8/00* | (2006.01) | |
| *B01J 8/18* | (2006.01) | |
| *B01J 8/26* | (2006.01) | |
| *B01J 19/32* | (2006.01) | |
| *C10G 11/18* | (2006.01) | |
| *B01J 8/12* | (2006.01) | |

(52) U.S. Cl.
CPC .............. *B01J 8/0065* (2013.01); *B01J 8/125* (2013.01); *B01J 8/1872* (2013.01); *B01J 8/26* (2013.01); *B01J 19/32* (2013.01); *C10G 11/182* (2013.01); *B01J 2208/00752* (2013.01); *B01J 2208/00761* (2013.01); *B01J 2208/00884* (2013.01)

(58) Field of Classification Search
CPC ..... B01J 8/0065; B01J 8/44; B01J 8/26; B01J 8/125; B01J 8/1872; B01J 19/32
See application file for complete search history.

(56) References Cited

U.S. PATENT DOCUMENTS

| | | | |
|---|---|---|---|
| 2,472,502 A * | 6/1949 | Tyson | B01J 8/1881 |
| | | | 208/151 |
| 5,069,830 A * | 12/1991 | Moore | B01D 3/32 |
| | | | 261/94 |
| 6,503,461 B1 | 1/2003 | Burgard et al. | |
| 6,680,030 B2 | 1/2004 | Koebel et al. | |
| 7,077,997 B1 | 7/2006 | Sandacz | |
| 7,332,132 B2 | 2/2008 | Hedrick et al. | |
| 2016/0152482 A1 | 6/2016 | Nettles et al. | |
| 2016/0158741 A1 * | 6/2016 | Palmas | B01J 8/26 |
| | | | 502/55 |

FOREIGN PATENT DOCUMENTS

| | | |
|---|---|---|
| CN | 202844980 U | 4/2013 |
| CN | 205527778 U | 8/2016 |
| WO | 2016008654 A1 | 1/2016 |

\* cited by examiner

*Primary Examiner* — Lessanework Seifu

(57) ABSTRACT

A vessel provides for removing hydrocarbons from a catalyst. In an FCC unit, the vessel includes first and second sections. The first section includes at least one grid having a plurality of intersecting members and openings therebetween. The second section includes structured packing such as a plurality of ribbons. Grids are supported by pipes that are supported by the second section.

17 Claims, 5 Drawing Sheets

… (1)

VESSEL FOR REMOVING HYDROCARBONS ON CATALYST

FIELD

This field relates generally to a vessel used to recover hydrocarbons from a catalyst, and more particularly to a vessel use to recover hydrocarbons entrained on a catalyst.

BACKGROUND

A variety of processes contact finely divided particulate material with a hydrocarbon containing feed under conditions wherein a fluid maintains the particles in a fluidized condition to effect transport of the solid particles to different stages of the process. Fluid catalytic cracking (FCC) is a prime example of such a process that contacts hydrocarbons in a reaction zone with a catalyst composed of finely divided particulate material. The hydrocarbon feed fluidizes the catalyst and typically transports it in a riser as the catalyst promotes the cracking reaction. As the cracking reaction proceeds, substantial amounts of hydrocarbon, called coke, are deposited on the catalyst.

A high temperature regeneration, typically within a regeneration zone, burns coke from the catalyst by contacting the catalyst with an oxygen-containing stream that again serves as a fluidization medium. Coke-containing catalyst, referred to herein as spent catalyst, is continually removed from the reaction zone and replaced by essentially coke-free catalyst from the regeneration zone. Fluidization of the catalyst particles by various gaseous streams allows the transport of catalyst between the reaction zone and regeneration zone.

A majority of the hydrocarbon vapors that contact the catalyst in the reaction zone are separated from the solid particles by various separation methods within the reaction zone such as ballistic and/or centrifugal separation. However, the catalyst particles employed in FCC processes typically have a large surface area, which is due to a great multitude of pores located in the particles. As a result, the catalytic materials may retain hydrocarbons within their pores, upon the external surface of the catalyst, as well as within the spaces between individual catalyst particles. Although the quantity of hydrocarbons retained on each individual catalyst particle may be very small, the vast amount of catalyst and the high catalyst circulation rate which is typically used in modern FCC processes results in a significant quantity of hydrocarbons being withdrawn from the reaction zone with the catalyst. Therefore, it is common to remove, or strip, hydrocarbons from spent catalyst prior to passing it into a regeneration zone.

The most common method of stripping hydrocarbons from the catalyst utilizes a stripping gas, usually steam, passed through a stream of catalyst, counter-current to the direction of flow of the catalyst. Such steam stripping operations, with varying degrees of efficiency, remove the hydrocarbon vapors which are entrained with the catalyst and adsorbed on the catalyst.

An efficient stripping vessel is disclosed in U.S. Pat. No. 7,332,132 which utilizes a structured packing section that comprises a plurality of ribbons. More specifically, the ribbons comprise angular bends and openings between adjacent edges to allow catalyst to flow uniformly into a stripping vessel.

In existing FCC stripping vessels which have been reconfigured to include structured packing, since the structured packing may occupy less vertical space within the vessel, there may be a large distance between the structure packing and the inlet to the stripping section. If unobstructed, the catalyst level above the packing can sometime be excessive, greater than 0.91 m (3 ft), and in some cases as much as 4.5 m (15 ft) or greater. If this space is left devoid of equipment, the catalyst may accumulate which requires a refiner to maintain a higher catalyst inventory.

Additionally, the over accumulation of catalyst can result in catalyst compression leading to gas bypassing where the rising steam will channel through the stripping vessel without entering into an emulsion phase with the catalyst to remove the entrained hydrocarbons by stripping. This leads to a reduction in stripping efficiency and hydraulic issues in, for example, the reactor, the stripping vessel, the regeneration vessel, the regenerated catalyst standpipe and the spent catalyst standpipe. Similar bypassing of combustion gas through catalyst can occur in a catalyst regenerator.

Therefore, there remains a need for effective and easily installed equipment for facilitating removal of gases from catalyst. A particular need exists for such equipment above a stripping section that minimizes the risk of channeling and mal-distribution of the catalyst and stripping medium vapors. Similar equipment can be used in a regenerator to provide proper mixing of catalyst and combustion gas.

SUMMARY

A vessel for removing hydrocarbons from catalyst has a first section including a first grid and a second grid that includes at least one opening to allow catalyst to pass there through.

A pipe secured to the first grid supports the second grid.

DETAILED DESCRIPTION OF THE DRAWINGS

In the drawings, one or more embodiments are shown in which like numerals denote like elements and in which.

DETAILED DESCRIPTION

Figure 1:
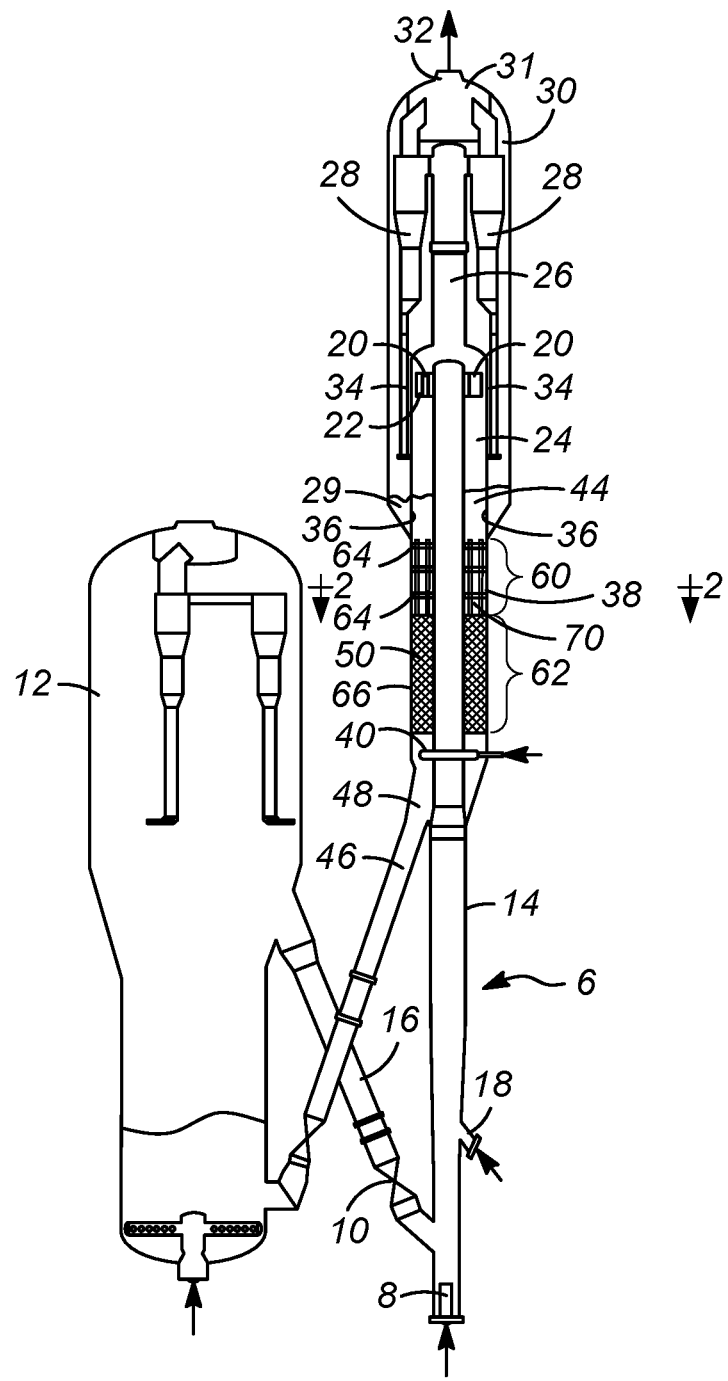
FIG. 1 shows a sectional elevation view of an FCC reactor and stripping vessel arrangement.

As discussed above, a vessel for removing entrained gas from a catalyst in which a first section of grids is disposed apart from a second section of structured packing. The grid(s) distribute catalyst that flows downward through the vessel. The grids(s) occupy the empty space above the inlet of the vessel to distribute catalyst and gas and avoid over accumulation of the catalyst. The section of grids is especially applicable to a process unit that is being retrofitted to include a newer and more efficient stripping section or regeneration section such as in an FCC unit. The grids occupy the empty space above or below the second section with structured packing.

Installation of grids on top of support rings welded to an internal riser constitute a significant amount of time for field installation. The amount of time required includes welding to existing internal components such as the metal wall of the vessel, possible repair of an abrasion resistant lining on the wall of the vessel, and post weld treatment. For perspective, it can take as long to install a layer of grids as it takes to install six layers of structured packing. This increases total unit shut down time, thereby increasing labor expenses and profit lost to down time. The vessel significantly reduces the amount of field welding required to install the grids.

With reference to the attached drawings, one or more embodiments will now be described with the understanding that these embodiments are merely exemplary.

The vessel described for removing entrained hydrocarbons from catalyst may be used in an FCC process or other process that utilizes fluidized catalyst such as a methanol to olefins process. The description will relate to an FCC process, but other processes that use fluidized catalyst may be applicable. As will be appreciated, the typical feed to an FCC process unit is a gas oil such as a light or vacuum gas oil. Other petroleum-derived feed streams to an FCC process unit may comprise a diesel boiling range mixture of hydrocarbons or heavier hydrocarbons such as reduced crude oils. It is preferred that the feed stream consists of a mixture of hydrocarbons having boiling points, as determined by the appropriate ASTM test method, above about 230° C. (446° F.) and preferably above about 290° C. (554° F.), and most preferably in the range of 343 to 552° C. (650 to 1025° F.).

An FCC process unit generally comprises a reaction zone and a catalyst regeneration zone. In the reaction zone, a feed stream is contacted with a finely divided fluidized catalyst maintained at an elevated temperature and at a moderate positive pressure. Contacting of feed and catalyst may take place in a riser conduit, or it may occur in any other effective arrangement such as the known devices for short contact time contacting. In the case of a riser, it comprises a principally vertical conduit as the main reaction site, with the effluent of the conduit emptying into a large volume process vessel containing a solids-vapor separation device. The products of the reaction are separated from a portion of catalyst which falls downwardly. A stripping vessel usually receives the spent catalyst to remove hydrocarbons from the catalyst. Catalyst is transferred to a separate regeneration zone after it passes through the stripping vessel.

The rate of conversion of the feedstock within the reaction zone is controlled by regulation of the temperature, activity of the catalyst, and quantity of the catalyst relative to the feed (C/O ratio) maintained within the reaction zone. The most common method of regulating the temperature in the reaction zone is by regulating the rate of circulation of catalyst from the regeneration zone to the reaction zone, which simultaneously changes the C/O ratio. That is, if it is desired to increase the conversion rate within the reaction zone, the rate of flow of catalyst from the regeneration zone to the reaction zone is increased. This results in more catalyst being present in the reaction zone for the same volume of oil charged thereto. Since the temperature within the regeneration zone under normal operations is considerably higher than the temperature within the reaction zone, an increase in the rate of circulation of catalyst from the regeneration zone to the reaction zone results in an increase in the reaction zone temperature.

The chemical composition and structure of the feed to an FCC process unit will affect the amount of coke deposited upon the catalyst in the reaction zone. Normally, the higher the molecular weight, Conradson carbon, heptane insolubles, and carbon-to-hydrogen ratio of the feedstock, the higher will be the coke level on the spent catalyst. In addition, high levels of combined nitrogen, such as found in shale-derived oils, will increase the coke level on spent catalyst. The processing of heavier feedstocks, such as deasphalted oils or atmospheric bottoms from a crude oil fractionation unit (commonly referred to as reduced crude) typically results in an increase in some or all of these factors and therefore causes an increase in the coke level on spent catalyst.

The reaction zone, which is normally referred to as a "riser" due to the widespread use of a vertical tubular conduit, is maintained at high temperature conditions which generally include a temperature above about 425° C. (797° F.). The reaction zone is maintained at cracking conditions which include a temperature of from about 480° C. (896° F.) to about 590° C. (1094° F.) and a pressure of from about 100 to 400 kPa (15 to 60 psig), sometimes less than about 140 kPa (20 psig). The C/O ratio, based on the weight of catalyst and feed hydrocarbons entering the bottom of the riser, may range up to 20:1 but is preferably between about 4:1 and about 10:1. Hydrogen is not normally added to the riser, although hydrogen addition is known in the art. Typically, steam is passed into the riser. The average residence time of catalyst in the riser may be less than about 5 seconds. The type of catalyst employed in the process may be chosen from a variety of commercially available catalysts. A catalyst comprising a zeolite base material is preferred, but the older style amorphous catalyst can be used if desired. Further information on the operation of FCC reaction zones is known in the art.

In an FCC process, catalyst is continuously circulated from the reaction zone to the regeneration zone and then again to the reaction zone. The catalyst therefore acts as a vehicle for the transfer of heat from zone to zone as well as providing the necessary catalytic activity. Any FCC catalyst can be used for the process. The particles will typically have a size of less than 100 microns. The catalyst which is being withdrawn from the regeneration zone is referred to as "regenerated" catalyst. As previously described, the catalyst passed to the regeneration zone is brought into contact with an oxygen-containing gas such as air or oxygen-enriched air under conditions which result in combustion of the coke. This results in an increase in the temperature of the catalyst and the generation of a large amount of hot gas which is removed from the regeneration zone as a gas stream referred to as a flue gas stream. The regeneration zone is normally operated at a temperature of from about 600° C. (1112° F.) to about 800° C. (1472° F.). The operation of FCC regeneration zones is also well known in the art.

Generally, the catalyst regeneration zone may be operated at a pressure of from about 70 to 400 kPa (10 to 60 psig). The spent catalyst being charged to the regeneration zone may contain from about 0.2 to about 2.0 wt % coke. This coke is predominantly comprised of carbon and can contain from about 3 to 12 wt % hydrogen, as well as sulfur and other elements. The oxidation of coke will produce carbon dioxide, carbon monoxide, and water. As known to those skilled in the art, the regeneration zone may take several configurations, with regeneration being performed in one or more stages. Further variety is possible due to the fact that regeneration may be accomplished with the fluidized catalyst being present as either a dilute phase or a dense phase within the regeneration zone. The term "dilute phase" is intended to indicate a catalyst/gas mixture having a density of less than about 300 kg/m$^3$ (18.7 lb/ft). In a similar manner, the term "dense phase" is intended to mean that the catalyst/gas mixture has a density equal to or more than about 300 kg/m$^3$ (18.7 lb/ft). Representative dilute phase operating conditions often include a catalyst/gas mixture having a density of about 15 to 150 kg/m$^3$ (0.9 to 9.4 lb/ft).

Turning to FIG. 1, an FCC unit 6 is shown to which the described apparatus may be applied. The FCC unit 6 in FIG. 1 represents only one of many FCC arrangements that may be applicable.

In the FCC unit 6 of FIG. 1, a regenerator standpipe 16 transfers catalyst from a regenerator 12 at a rate regulated by a slide valve 10. A fluidization medium from a nozzle 8 transports catalyst upwardly through a lower portion of a riser 14 at a relatively high density until a plurality of feed injection nozzles 18 (only one is shown) inject feed across the flowing stream of catalyst particles. The resulting mixture continues upward through an upper portion of the riser 14 until at least two disengaging arms 20 tangentially discharge the mixture of gas and catalyst through openings 22 from a top of the riser 14 into a disengaging vessel 24 that effects separation of gases from the catalyst. Most of the catalyst discharged from openings 22 falls downwardly in the disengaging vessel 24 into a bed 44. A transport conduit 26 carries the separated hydrocarbon vapors with entrained catalyst to one or more cyclones 28 in a reactor or separator vessel 30. The cyclones 28 separate spent catalyst from the hydrocarbon vapor stream. A collection chamber 31 gathers the separated hydrocarbon vapor streams from the cyclones for passage to an outlet nozzle 32 and into a downstream fractionation zone (not shown).

Diplegs 34 discharge catalyst from the cyclones 28 into a bed 29 in a lower portion of the disengaging vessel 24 which pass through ports 36 into the bed 44 in the disengaging vessel 24. Catalyst and adsorbed or entrained hydrocarbons pass from the disengaging vessel 24 into a stripping vessel 38 across ports 36. Catalyst from openings 22 separated in the disengaging vessel 24 passes directly into the stripping vessel 38. Hence, the inlets to the stripping vessel 38 include openings 22 and ports 36. In order to facilitate removal of hydrocarbon entrained on or with the catalyst, the stripping vessel 38 includes a first section 60 and a second section 62. The first section 60 includes at least one grid 64 having at least one opening to allow catalyst to pass there through. It is contemplated that an apparatus similar to the first section 60 and/or the second section 62 can be provided in the regenerator 12 to facilitate removal of hydrocarbon from catalyst.

Figure 2:
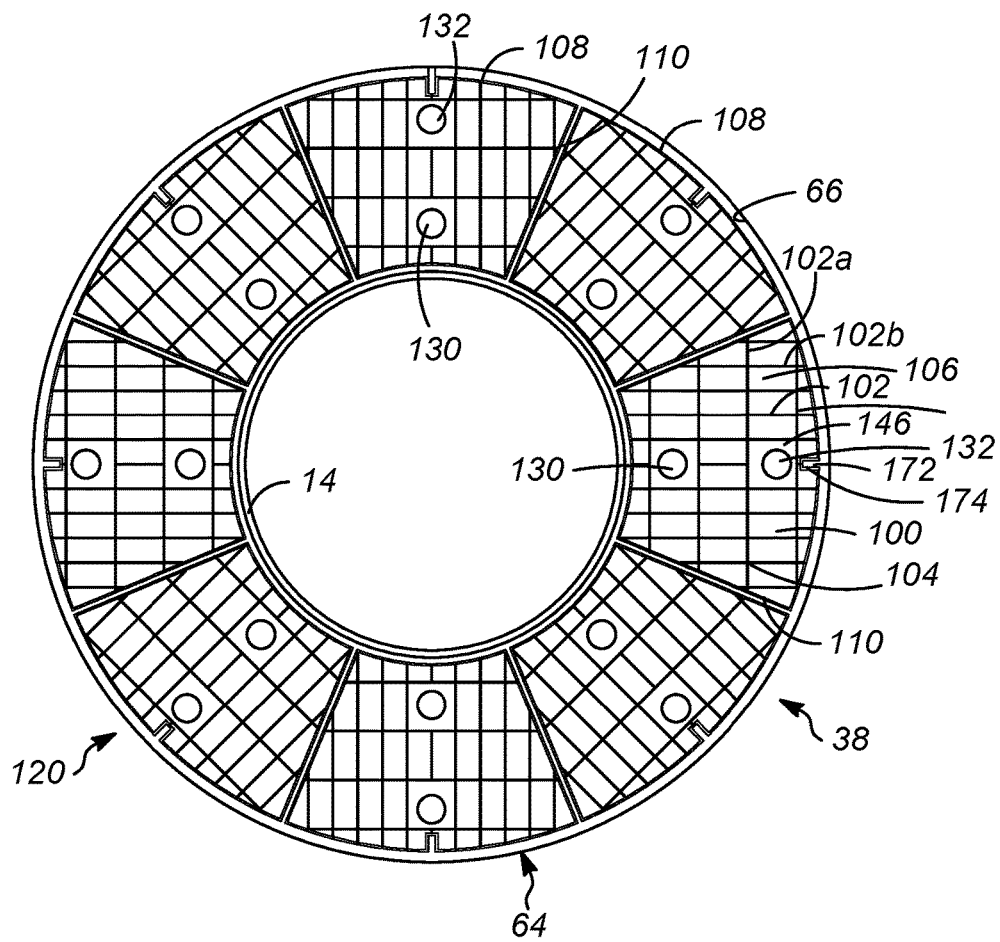
FIG. 2 shows an embodiment of a grid used in one or more embodiments.
Figure 3:
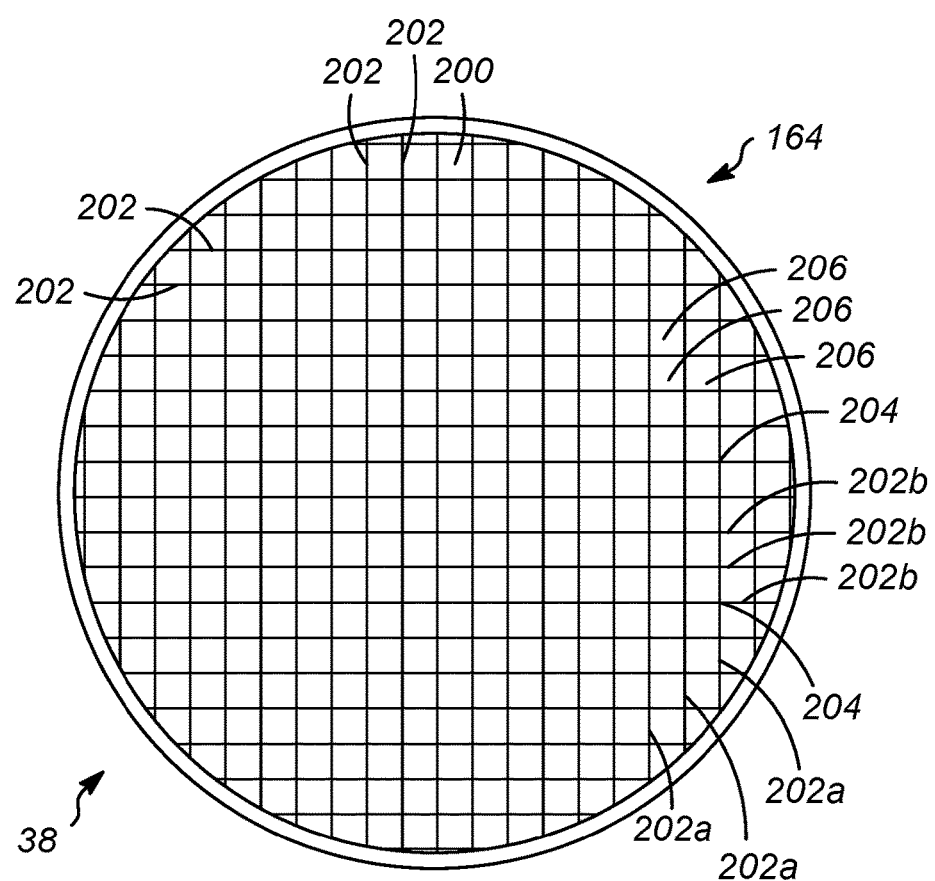
FIG. 3 shows another embodiment of a grid used in one or more embodiments.

A preferred design for the grids 64 is disclosed is shown in FIGS. 2 and 3. In both FIGS. 2 and 3, the grids 64, 164 comprise grating 100, 200 or a series of elongate strips 102, 202 with a first plurality of the strips 102a, 202a running in a first direction and a second plurality of the strips 102b, 202b running in a second direction perpendicular to the first direction. Between the intersections 104, 204 of the various strips 102a, 102b, 202a, 202b are a plurality of openings 106, 206. In stripping vessels in which there is an internal riser, such as the stripping vessel 38 depicted in FIG. 1, both the first section 60 and the second section 62 may be disposed in an annulus 70 between the riser 14 and a wall 66 of the stripping vessel 38. In such configurations, the grid(s) 64 in the first section 60 may comprise a plurality of sectors 108 as shown in FIG. 2. In some embodiments, the sectors 108 are bounded by radial edges 110 which may be secured to the elongate strips 102, 202 and to adjacent sectors 108 such as by welding or by bolting. In FIG. 2, eight sectors 108 of grating may comprise a grid 64. Other configurations are also contemplated.

For stripping vessels in which the riser is external (not shown), the grids 164, as shown in FIG. 3, may comprise a grating 200 that extends over the almost all of or the entire horizontal cross section of the stripping vessel 38. Although not depicted as such, the grating 100 may also comprise sections that are separated by a gap. For example, suitable grids are disclosed in U.S. Pat. Nos. 6,680,030 and 7,077,997.

Figure 4:
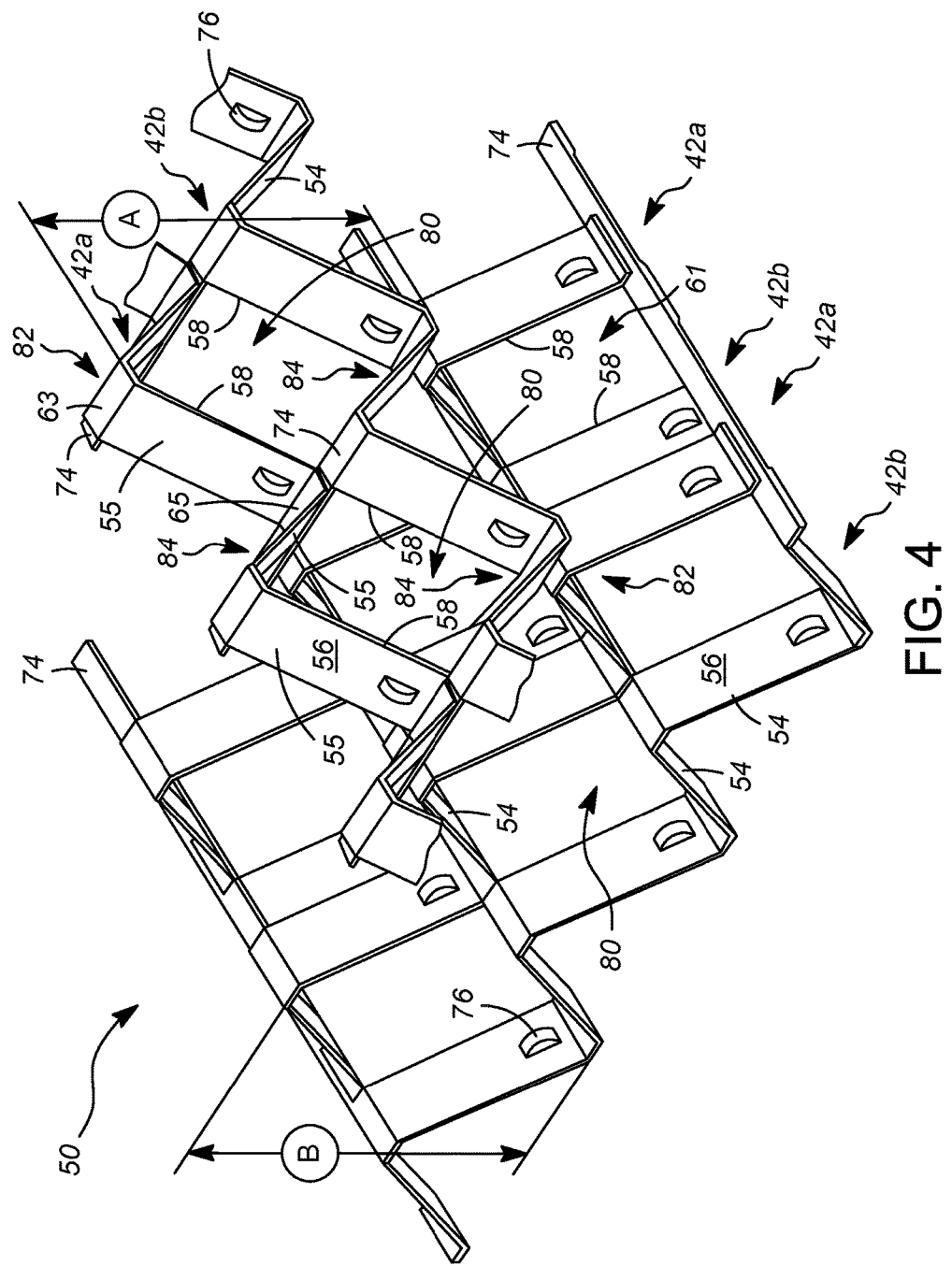
FIG. 4 shows structure packing used in one or more embodiments.

Returning to FIG. 1, the second section 62 comprises a structured packing 50. In one embodiment, as shown in FIG. 4, the structured packing 50 comprises a plurality of ribbons 42a, 42b. Each ribbon 42a, 42b may comprise bands 54 configured in undulating peaks 82 and valleys 84. Each band 54 includes a face 56 that obstructs passage of fluid and catalyst. In a preferred embodiment, the bands 54 include laterals 55 arranged to provide peaks 82 at an upper landing 63 and valleys 84 at a lower landing 65, but the peaks 82 and valleys 84 may be provided at the apex of a joint of just two bands 54. Each layers A, B includes paired ribbons 42a, 42b. The lower landings 65 in upper ribbon 42a meet the upper landings 63 of the lower ribbon 42b. A stabilizing strip 74 may be disposed between the upper landing 63 and the lower landing 65. If the paired ribbons 42a, 42b are cut out of a common piece of metal, a stabilizing strip 74 may be obviated. The ribbon 42a is disposed at a phase that is 90° out of phase to the phase of the paired ribbon 42b. Other phase relationships may be used.

Moreover, the axial spacing of a ribbon 42a is offset from the axial spacing of its paired ribbon 42b. Consequently, the edges 58 of the ribbon 42a and the edges 58 of the ribbon 42b may be parallel and may define a plane there between. The edges 58 of the laterals 55 and the landings 63, 65 in ribbon 42a and the edges 58 of the laterals 55 and the landings 63, 65 in ribbon 42b define openings 80 for the horizontal passage of the rising stripping fluid and the falling catalyst particles. The edges of laterals 55 and landings 63, 65 in alternating upper ribbons 42a and alternating lower ribbons 42b define openings 61 for the vertical passage of the rising stripping fluid and the falling catalyst particles. These openings 80, 61 are also defined by the faces 56 of the laterals 55 and the upper and the lower landings 63, 65. Dimples 76 may be provided in the bands 54. Although shown in the laterals 55 near the valleys 84, the dimples 76 may be disposed in the lower landings 65. It is also contemplated that the edges 58 of the laterals 55 may be secured to each other in which case the laterals 55 would cross each other. Moreover, although the ribbons 42a, 42b are preferably stacked horizontally in the second section 62, the ribbons 42a, 42b may be arranged vertically in the second section 62. Other configurations for the structured packing 50 in the second section 62 may be used. For example, although not depicted as such the ribbons in the second section 62 may include segments with upper and lower tabs extending away therefrom in alternative directions. Such ribbons are disclosed for example in U.S. Pat. No. 7,332,132, the entirety of which is incorporated herein by reference.

Although the at least one grid 64 of the first section 60 is depicted disposed above the structured packing 50 of the second section 62, it is contemplated (although not shown) that the second section 62 may be disposed above the first section 60, and that the structured packing 50 may be above at least one grid(s) 64.

In operation, with reference to FIG. 1, stripping gas such as steam enters a lower portion of the stripping vessel 38 through a distributor 40 and rises counter-current to a downward flow of catalyst through the second section 62 of the stripping vessel 38, and then the first section 60 of the stripping vessel 38, thereby removing adsorbed and entrained hydrocarbons from the catalyst. The hydrocarbons flow upwardly through and are ultimately recovered with the steam by the cyclones 28. The distributor 40 distributes the stripping gas around the circumference of the stripping vessel 38. The stripping gas removes the entrained and adsorbed hydrocarbons from the spent catalyst, and rises up through the stripping vessel 38. The spent catalyst leaves the stripping vessel 38 through a port 48 of a conduit 46 and passes into the regenerator 12. The catalyst is regenerated in the regenerator 12 as is known in the art and sent back to the riser 14 through the regenerator standpipe 16.

In order to control the size and distribution of the catalyst bed 44 above the second section 62 of the stripping vessel 38, the at least one grid 64 is preferably spaced between about 0.91 m (3 ft) to about 1.5 m (5 ft) from the second section 62. If the first section 60 includes a plurality of grids 64, the grids 64 are preferably each spaced apart from each other between about 0.91 m (3 ft) to about 1.5 m (5 ft). In some embodiments, the spacing between the grid 64 and the second section is at least about 0.91 m (3 ft) and possibly greater than 1.5 m (5 ft). Furthermore, the grid(s) 64 in the first section 60 are most preferably spaced from the second section 62 so as to minimize an accumulation of catalyst on top of the second section 62, which in some embodiments the spacing is at least 1.2 m (4 ft), or at least 0.91 m (3 ft) or 0.61 m (2 ft).

Furthermore, in some embodiments, the number of grids 64 in the first section 60 will be dependent on the spacing between the top of the second section 62 and the inlets into the stripping vessel 38.

The use of the grids 64 in the first section 60 allows for existing stripping vessels 38 to be retrofitted with more efficient stripping equipment while minimizing catalyst maldistribution that may occur as a result of excess space above the stripping equipment in the stripping vessel 38. The grids 64 provide a cost efficient solution without negatively impacting the flow of the catalyst, stripping vapors, or recovered hydrocarbons.

Figure 5:
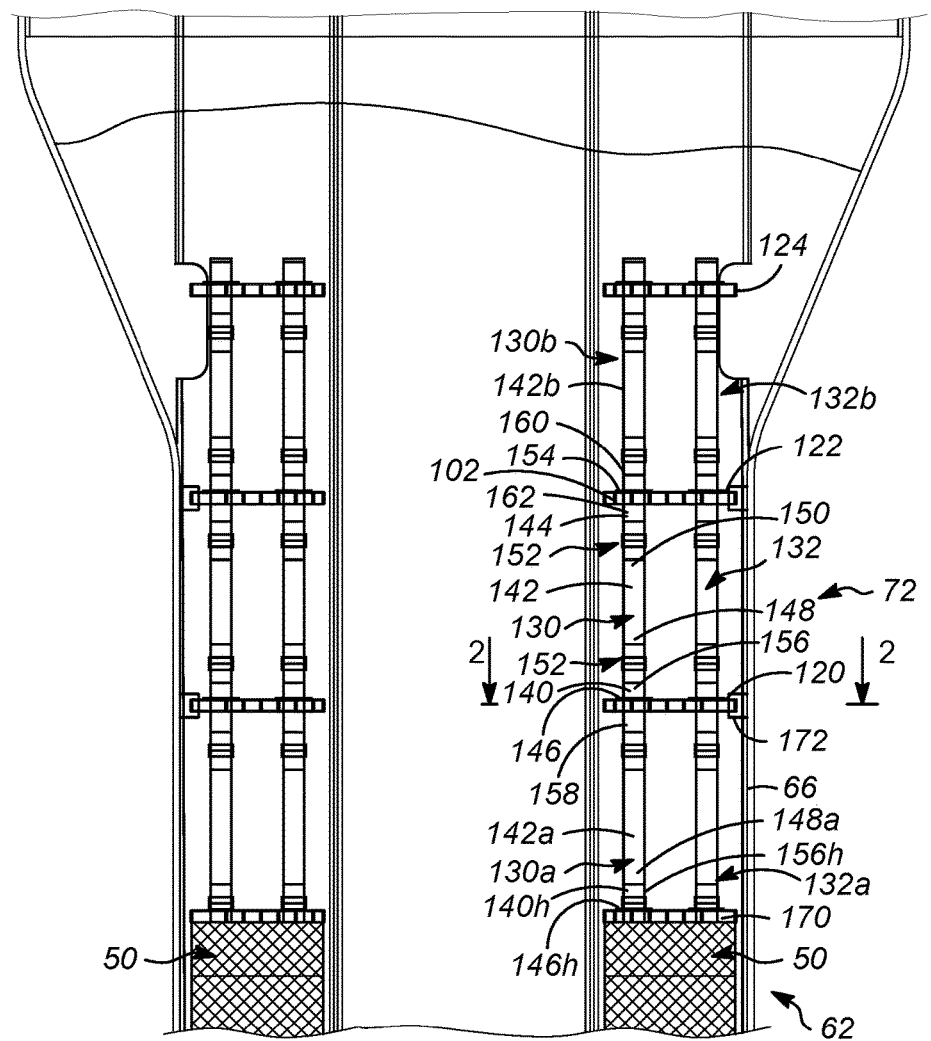
FIG. 5 shows an enlarged partial view of FIG. 1.

A support structure 72 allows for easy installation of the first section 60. The support structure 72 is shown best in FIG. 5 which is an enlarged partial view of FIG. 1. For reference, FIG. 2 is a sectional view taken at segment 2-2 of FIG. 5. The first section 60 may comprise two grids, a first grid 120, a second grid 122 and it may comprise a third grid 124 or more grids. As shown in FIG. 5, the first section 60 may be disposed above the second section 62 comprising packing 50. A first pipe 130 may be secured to the first grid 120. The first pipe 130 may support the second grid 122. A second pipe 132 may be secured to the first grid and support the second grid 122. Referring to FIGS. 2 and 5, each sector 108 of a grid 120 may have a first pipe 130 and a second pipe 132 secured to it and support a sector 108 in an adjacent grid 122. In the embodiment shown in FIG. 2, if each grid 120 has eight sectors 108, the grid 120 will support 16 pipes 130, 132 to support the adjacent grid 122. The pipe 130, 132 is preferably hollow, but it may be solid and it may have a cross section that is circular or polygonal.

The first pipe 130 and the second pipe 132 may be composed of three segments. Further description will be dedicated to the first pipe 130, but the same description is applicable to the second pipe 132 and to all of the pipes 130 and 132 on one, some or all of the sectors 108 (FIG. 2) supporting each grid 120, 122 and 124.

The first pipe 130 may comprise a first segment 140 secured to the first grid 120, an intermediate segment 142 secured to the first segment and a second segment 144 secured to the second grid 122. The first segment 140 may be welded to the first grid 120. In an embodiment shown in FIGS. 2 and 5, the first segment 140 is welded to a plate 146, and the plate 146 is welded to the first grid 120, specifically to the elongate strips 102. It can be seen in FIG. 2 that a length of the elongate strip 102b is removed to allow the first pipe 130 and the second pipe 132 to pass through the first grid 120. The plate 146 is welded to the elongate strips 102a and 102b that surround the removed length of the elongate strip 102b.

Turning back to FIG. 5, the first segment 140 has an upper leg 156 that passes above the first grid 120 and is secured to the intermediate segment 142. The first segment 140 also has a lower leg 158 that passes below the first grid 120 and may be secured to an intermediate segment 142a of a first adjacent pipe 130a, if there is one, below the first grid 120. Otherwise, the lower leg 158 could be secured to an alternative support structure such as a hold down plate 170.

A first end 148 of the intermediate segment 142 is secured to the upper leg 156 of the first segment 140. The upper leg 156 of the first segment 140 and the first end 148 of the intermediate segment 142 may be secured together by a sleeved connection 152.

Similarly, the second segment 144 may be welded to the second grid 122. In an embodiment shown in FIG. 5, the second segment 144 is welded to a plate 154, and the plate 154 is welded to the second grid 122, specifically to the elongate strips 102. Similarly as shown in FIG. 2 for the first grid 120, but not visible in FIG. 5, a length of the elongate strip 102b is removed to allow the first pipe 130 and the second pipe 132 to pass through the second grid 122. The plate 154 is welded to the elongate strips 102a and 102b that surround the removed length of the elongate strip 102b removed.

The second segment 144 has an upper leg 160 that passes above the second grid 122 and is secured to an intermediate segment 142b of a second adjacent pipe 130b, if there is one, above the second grid 122. The second segment 144 also has a lower leg 162 that passes below the second grid 122 and is secured to a second end 150 of the intermediate segment 142 below the second grid 122. The lower leg 162 of the second segment 144 and the second end 150 of the intermediate segment 142 also may be secured together by a sleeved connection 152.

The sleeved connection that may be used to connect the upper leg 156 of the first segment 140 and the first end 148 of the intermediate segment 142 and the lower leg 162 of the second segment 144 and the second end 150 of the intermediate segment 142 is illustrated in FIG. 5 of U.S. Pat. No. 6,503,461 and described in the accompanying description of FIG. 5. Dur O Lok couplings manufactured by BETE Fog Nozzle, Inc. of Greenfield, Mass. may be suitable sleeved connections.

The first adjacent pipe 130a may be supported on the second section 62. In an embodiment, the second section may have a hold down plate 170 on its upper side that may resemble a grid 120 or 122. A plate 146h may be welded to the hold down plate 170 and a first segment 140h may be welded to the plate. An upper leg 156h of the first segment may be secured to the first end 148a of the intermediate segment 142a. The upper layers of the structured packing 50 may be configured to accommodate some of a lower leg of the first segment 140h which may be extended perhaps with an intermediate segment secured thereto to penetrate down into the packing 50, which arrangement is not shown. Accordingly, the lower leg 158 may be secured to the first adjacent pipe 130a that is supported on a second section 62 that may comprise the structural packing 50. A second, first adjacent pipe 132a, may be supported in the same way on one, some or all of the sectors 108 (FIG. 2).

Alternatively, a support ring may be fixed or welded to a wall 66 of the vessel 38 to support the support structure 72 in an alternative aspect that is not shown. In such an aspect, the support ring may support a hold down plate, like the hold down plate 170, which is supported independently of the second section 62. The hold down plate could support the first adjacent pipe 130a in a similar way as described for the hold down plate 170.

As shown in FIGS. 2 and 5, a lug 172 secured to the wall 66 of the vessel 38 and a notch 174, shown in FIG. 2, in the first grid 120 may engage the lug. The lug 172 may be welded to the wall 66. An inner surface of the wall 66 may be coated with a refractory lining which would have to allow the lug 172 to penetrate through the refractory lining into the annulus 70.

As shown in FIG. 5, the second adjacent pipe 130b may support a third grid 124 much like the pipe 130 supports the second grid 122. Similarly, a second adjacent pipe 132b may also support the third grid 124 much like the pipe 132 supports the second grid 122 for one, some or all of the sectors 108 (FIG. 2).

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments described.

SPECIFIC EMBODIMENTS

While the following is described in conjunction with specific embodiments, it will be understood that this description is intended to illustrate and not limit the scope of the preceding description and the appended claims.

A first embodiment of the invention is a vessel for removing hydrocarbons from catalyst, the vessel comprising a catalyst inlet configured to receive a stream of spent catalyst particles, at least some of the spent catalyst particles comprising entrained hydrocarbons; a first section, the first section including a first grid and a second grid, each grid including at least one opening to allow catalyst to pass there through, a pipe secured to the first grid and supporting the second grid; and an outlet configured to pass catalyst particles from the vessel. An embodiment of the invention is one, any or all of prior embodiments in this paragraph up through the first embodiment in this paragraph wherein the first grid and the second grid in the first section include a plurality of openings to allow catalyst to pass therethrough. An embodiment of the invention is one, any or all of prior embodiments in this paragraph up through the first embodiment in this paragraph, wherein the pipe comprises three segments a first segment secured to the first grid, an intermediate segment secured to the first segment and a second segment secured to the second grid. An embodiment of the invention is one, any or all of prior embodiments in this paragraph up through the first embodiment in this paragraph wherein segments are secured to each other with a sleeved connection. An embodiment of the invention is one, any or all of prior embodiments in this paragraph up through the first embodiment in this paragraph, wherein the first segment has an upper leg that passes above the first grid and is secured to the intermediate segment and lower leg that passes below the first grid. An embodiment of the invention is one, any or all of prior embodiments in this paragraph up through the first embodiment in this paragraph, wherein the lower leg is secured to a pipe that is supported on a second section that may comprise a structural packing. An embodiment of the invention is one, any or all of prior embodiments in this paragraph up through the first embodiment in this paragraph wherein the first segment is welded to a plate that is welded to the first grid. An embodiment of the invention is one, any or all of prior embodiments in this paragraph up through the first embodiment in this paragraph further comprising at least one gas inlet for admitting a gas disposed below the second section. An embodiment of the invention is one, any or all of prior embodiments in this paragraph up through the first embodiment in this paragraph further comprising a second section, the second section including a structured packing comprised of a plurality of ribbons, the second grid in the first section being spaced from the structured packing of the second section. An embodiment of the invention is one, any or all of prior embodiments in this paragraph up through the first embodiment in this paragraph further comprising a lug secured to a wall of the vessel and a notch in the first grid engages the lug.

A second embodiment of the invention is a vessel for stripping hydrocarbons from catalyst, the vessel comprising a catalyst inlet configured to receive a stream of spent catalyst particles, at least some of the spent catalyst particles comprising entrained hydrocarbons; a first section, the first section including a first grid and a second grid, each grid including at least one opening to allow catalyst to pass there through, a pipe secured to the first grid and supporting the second grid; a second section, the second section including a structured packing comprised of a plurality of ribbons, the second grid in the first section being spaced from the structured packing of the second section; a gas inlet for admitting a stripping gas disposed below the second section; and an outlet configured to pass catalyst particles from the vessel. An embodiment of the invention is one, any or all of prior embodiments in this paragraph up through the second embodiment in this paragraph, wherein the pipe comprises three segments a first segment secured to the first grid, an intermediate segment secured to the first segment and a second segment secured to the second grid. An embodiment of the invention is one, any or all of prior embodiments in this paragraph up through the second embodiment in this paragraph wherein segments are secured to each other with a sleeved connection. An embodiment of the invention is one, any or all of prior embodiments in this paragraph up through the second embodiment in this paragraph, wherein the first segment has an upper leg that passes above the first grid and is secured to the intermediate segment and lower leg that passes below the first grid. An embodiment of the invention is one, any or all of prior embodiments in this paragraph up through the second embodiment in this paragraph, wherein the lower leg is secured to a pipe that is supported on the second section. An embodiment of the invention is one, any or all of prior embodiments in this paragraph up through the second embodiment in this paragraph wherein the first segment is welded to a plate that is welded to the first grid.

A third embodiment of the invention is a vessel for removing hydrocarbons from catalyst, the vessel comprising a catalyst inlet configured to receive a stream of spent catalyst particles, at least some of the spent catalyst particles comprising entrained hydrocarbons; a first section, the first section including a first grid and a second grid, each grid including at least one opening to allow catalyst to pass there through, a pipe comprising three segments, a first segment secured to the first grid, an intermediate segment secured to the first segment and a second segment secured to the second grid; and an outlet configured to pass catalyst particles from the vessel. An embodiment of the invention is one, any or all of prior embodiments in this paragraph up through the third embodiment in this paragraph wherein segments are secured to each other with a sleeved connection. An embodiment of the invention is one, any or all of prior embodiments in this paragraph up through the third embodiment in this paragraph, wherein the first segment has an upper leg that passes above the first grid and is secured to the intermediate segment and lower leg that passes below the first grid. An embodiment of the invention is one, any or all of prior embodiments in this paragraph up through the third embodiment in this paragraph, wherein the lower leg is secured to a pipe that is supported on a second section that may comprise a structural packing.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A vessel for removing hydrocarbons from catalyst, the vessel comprising:
    a catalyst inlet configured to receive a stream of spent catalyst particles, at least some of the spent catalyst particles comprising entrained hydrocarbons;
    a first section, the first section including a first grid and a second grid, each grid including at least one opening to allow catalyst to pass there through, a pipe secured to the first grid and supporting the second grid, wherein the pipe comprises three segments: a first segment secured to the first grid, an intermediate segment secured to the first segment and a second segment secured to the second grid; and
    an outlet configured to pass catalyst particles from the vessel.

2. The vessel of claim 1 wherein the first grid and the second grid in the first section include a plurality of openings to allow catalyst to pass therethrough.

3. The vessel of claim 1 wherein segments are secured to each other with a sleeved connection.

4. The vessel of claim 1 wherein the first segment has an upper leg that passes above the first grid and is secured to the intermediate segment and a lower leg that passes below the first grid.

5. The vessel of claim 4 wherein the lower leg is secured to a pipe that is supported on a second section that may comprise a structural packing.

6. The vessel of claim 4 wherein the first segment is welded to a plate that is welded to the first grid.

7. The vessel of claim 5 further comprising at least one gas inlet for admitting a gas disposed below the second section.

8. The vessel of claim 7 further comprising a second section, the second section including a structured packing comprised of a plurality of ribbons, the second grid in the first section being spaced from the structured packing of the second section.

9. The vessel of claim 1 further comprising a lug secured to a wall of the vessel and a notch in the first grid engages said lug.

10. A vessel for stripping hydrocarbons from catalyst, the vessel comprising:
    a catalyst inlet configured to receive a stream of spent catalyst particles, at least some of the spent catalyst particles comprising entrained hydrocarbons;
    a first section, the first section including a first grid and a second grid, each grid including at least one opening to allow catalyst to pass there through, a pipe secured to the first grid and supporting the second grid, wherein the pipe comprises three segments: a first segment secured to the first grid, an intermediate segment secured to the first segment and a second segment secured to the second grid and wherein the segments are secured to each other with a sleeved connection;
    a second section, the second section including a structured packing comprised of a plurality of ribbons, the second grid in the first section being spaced from the structured packing of the second section;
    a gas inlet for admitting a stripping gas disposed below the second section; and
    an outlet configured to pass catalyst particles from the stripping vessel.

11. The vessel of claim 10 wherein the first segment has an upper leg that passes above the first grid and is secured to the intermediate segment and lower leg that passes below the first grid.

12. The vessel of claim 11 wherein the lower leg is secured to a pipe that is supported on the second section.

13. The vessel of claim 11 wherein the first segment is welded to a plate that is welded to the first grid.

14. A vessel for removing hydrocarbons from catalyst, the vessel comprising:
    a catalyst inlet configured to receive a stream of spent catalyst particles, at least some of the spent catalyst particles comprising entrained hydrocarbons;
    a first section, the first section including a first grid and a second grid, each grid including at least one opening to allow catalyst to pass there through;
    a pipe comprising three segments, a first segment secured to the first grid, an intermediate segment secured to the first segment and a second segment secured to the second grid; and
    an outlet configured to pass catalyst particles from the vessel.

15. The vessel of claim 14 wherein segments are secured to each other with a sleeved connection.

16. The vessel of claim 14 wherein the first segment has an upper leg that passes above the first grid and is secured to the intermediate segment and lower leg that passes below the first grid.

17. The vessel of claim 16 wherein the lower leg is secured to a pipe that is supported on a second section that may comprise a structural packing.

* * * * *